US012276804B2

(12) United States Patent
Trincia

(10) Patent No.: US 12,276,804 B2
(45) Date of Patent: Apr. 15, 2025

(54) CONFORMABLE FACIAL INTERFACE

(71) Applicant: Apple Inc., Cupertino, CA (US)

(72) Inventor: Nicholas R Trincia, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/347,266

(22) Filed: Jul. 5, 2023

(65) Prior Publication Data

US 2024/0061254 A1 Feb. 22, 2024

Related U.S. Application Data

(60) Provisional application No. 63/371,722, filed on Aug. 17, 2022.

(51) Int. Cl.
*G02B 27/01* (2006.01)
(52) U.S. Cl.
CPC ................. *G02B 27/0176* (2013.01)
(58) Field of Classification Search
CPC .................................. G02B 27/0176
See application file for complete search history.

(56) References Cited

U.S. PATENT DOCUMENTS

| 9,989,998 | B1* | 6/2018 | Yee | G02B 27/0176 |
| 11,686,948 | B2* | 6/2023 | Law | G02B 27/0176 345/8 |
| 11,768,538 | B1* | 9/2023 | Wang | G02B 27/0176 345/156 |
| 11,782,480 | B1* | 10/2023 | Hatfield | G06F 1/163 224/576 |
| 2019/0212772 | A1* | 7/2019 | Chen | G06F 1/1656 |
| 2019/0235254 | A1* | 8/2019 | Kamakura | G02B 27/0172 |
| 2020/0225493 | A1* | 7/2020 | Yu | G02B 27/017 |
| 2022/0187609 | A1* | 6/2022 | Snyder | G02B 27/0176 |

* cited by examiner

*Primary Examiner* — Kenneth B Lee, Jr.
(74) *Attorney, Agent, or Firm* — Dorsey & Whitney LLP

(57) ABSTRACT

A wearable electronic device including a display, a frame attachable to the display, a facial interface movably attached to the frame, and a linkage assembly movably connecting the facial interface to the frame. The linkage assembly can include a first arm pivotably attached to the frame, the first arm comprising a first end and a second end, a second arm pivotably attached to the first end and attached to the facial interface, and a third arm pivotably attached to the second end and attached to the facial interface.

21 Claims, 9 Drawing Sheets

CONFORMABLE FACIAL INTERFACE

CROSS-REFERENCE TO RELATED APPLICATION(S)

This claims priority to U.S. Provisional Patent Application No. 63/371,722, filed 17 Aug. 2022, and entitled "CONFORMABLE FACIAL INTERFACE," the entire disclosure of which is hereby incorporated by reference.

FIELD

The described embodiments relate generally to facial interfaces of a head-mountable device. More particularly, the present disclosure relates to facial interfaces of a head-mountable device that can dynamically conform to provide increased comfort, flexure, and fitting.

BACKGROUND

Recent advances in portable computing have enabled head-mountable devices that provide augmented and virtual reality (AR/VR) experiences to users. Such head-mountable devices typically include various components such as a display, a viewing frame, a lens, a battery, a motor, a speaker, and other components. These components can operate together to provide an immersive user experience. In particular, head mountable-devices include components that help provide a distraction-free setting by blocking or sealing out the outer environment (e.g., ambient light).

Additionally, users have a myriad of different anatomical features, including head size, eye location, cheek and forehead bone structure, and so forth. Unfortunately, conventional head-mountable devices fail to provide a custom, comfortable fit for a fully immersive experience. Indeed, conventional head-mountable devices have rudimentary customization features, if any. For example, users of a conventional head-mountable device may have differing facial structures that the head-mountable device cannot accommodate. This user-to-user variation can create a poor user experience, causing too much or not enough pressure on a user's face from the head-mountable device. Therefore, a head-mountable device capable of comfortably and dynamically adapting to different user facial profiles is desired.

SUMMARY

According to one embodiment, a wearable device includes a display, a frame attachable to the display, a facial interface movably attached to the frame, and a linkage assembly movably connecting the facial interface to the frame. In some examples, the linkage assembly includes a first arm pivotably attached to the frame, the first arm including a first end and a second end, a second arm pivotably attached to the first end and attached to the facial interface, and a third arm pivotably attached to the second end and attached to the facial interface.

In some examples of the wearable device, the wearable device is a head-mountable device, each of the second arm and the third arm includes a first connector and a second connector attachable to the facial interface, and the linkage assembly evenly distributes a force applied to the facial interface. In some examples, the second arm and the third arm are slidably attached to the facial interface. In other examples, a ball joint connects the facial interface and the linkage assembly. In other examples the ball joint has about 30 degrees of motion. In some instances, the facial interface includes an elongated socket.

In another example, the second arm is pivotably attached to the facial interface at a first location and at a second location, and the third arm is pivotably attached to the facial interface at a third location and at a fourth location. In other examples the facial interface includes a dynamic arc-length.

In other embodiments, a head-mountable device includes a display unit, a facial interface, and a movement mechanism connecting the facial interface to the display unit, the movement mechanism including a pivot rotatably attached to the display unit, a first end moveably attached at a first location of the facial interface, and a second end moveably attached at a second location of the facial interface.

In some examples, the second location moves in response to a force being applied at the first location. In other examples, the movement mechanism includes a central arm including the pivot, a first side arm pivotably connected to a first portion of the central arm on a first side of the pivot, and a second side arm pivotably connected to a second portion of the central arm on a second side of the pivot. In other examples, the facial interface contacts a forehead region and a zygoma region of a user during use. In yet other examples the movement mechanism distributes forces evenly through the movement mechanism. In other examples the head mountable device further includes a post disposed on the head-mountable device to restrict a motion of the movement mechanism. In other examples a spring connects the movement mechanism to the display unit. In other examples, the facial interface includes a relief cutout.

In some embodiments, a facial interface for a head-mountable device includes a frame, a conformable member, and a linkage connecting the frame and the conformable member, the linkage attached to the frame at a hinge joint, and attached to the conformable member at a pivot point.

In some examples, the linkage deforms the conformable member at a first location in response to the conformable member being deformed at a second location. In other examples, the hinge joint is centered along a longitudinal axis of the linkage. In some examples, the pivot point is adjustable. In yet other examples, the frame is rigid and the conformable member is deformable.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
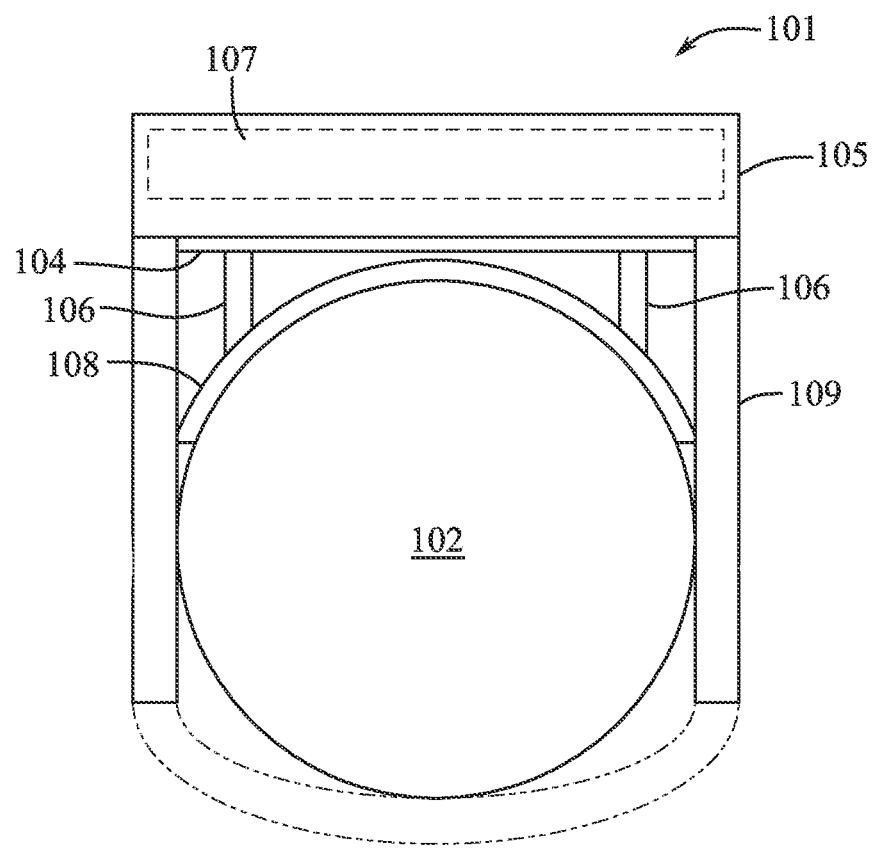
FIG. 1A shows a top view of a head-mountable device.

Detailed reference will now be made to representative embodiments illustrated in the accompanying drawings. The following descriptions are not intended to limit the embodiments to one preferred embodiment. The descriptions are intended to cover alternatives, modifications, and equivalents as can be included within the spirit and scope of the described embodiments as defined by the appended claims.

The point at which a head-mountable device contacts or interfaces with the user's face is important to the user experience. This location of direct contact with the user's face influences the comfort level while wearing the head-mountable device. Additionally, this interface is prone to allowing light from the outside environment to interfere with the user. Indeed, ambient peripheral light can enter the eye-box, causing distraction and discomfort for the user.

Properly conforming the facial interface to the user can be challenging. The facial interface must be able to suitably fit a wide variety of user characteristics, including head size, eye location, cheek and forehead bone structure, and so forth.

The present disclosure relates to a wearable electronic device, such as a head-mountable device (HMD). The HMD can include a display or display unit, a frame attachable to the display, a facial interface movably attachable to the frame, and a linkage assembly movably connecting the facial interface to the frame.

The facial interface can be a conformable member that is configured to directly contact the user's face. As described herein, the linkage can distribute forces through the facial interface to dynamically and reactively conform the facial interface to fit a wide variety of user faces.

In some examples, the linkage (also referred to as "linkage assembly", "movement mechanism", and "arm(s)") includes a first arm pivotably attached to the frame. The first arm can be a primary or central arm and can include a first end and a second end opposite the first end. The central arm can be attached to the frame at a pivot point. The pivot point allows the central arm to pivot, swivel, or rotate about the pivot axis established by the pivot point.

The pivot point can be centered along a longitudinal axis of the linkage. For example, the pivot point can be located at the center of the longitudinal axis of the central arm. A centered pivot point can provide uniform force distribution through the linkage. In some examples, the pivot point can be offset from the center, providing for an asymmetric or off-balance force distribution through the linkage. In some examples, the pivot point is adjustable. In some examples, the linkage can be tuned by adjusting the pivot point to achieve a desired force distribution.

In some examples, the ends of the central arm is directly attached to the facial interface at first and second locations, respectively. Thus, due to the pivoting nature of the central arm and its attachment to first and second locations on the facial interface, a force applied at the first location causes a change (e.g., applies a force) at the second location, and vice versa. In other words, the second location can deform or move in response to a force being applied at the first location due to the force being transferred through the central arm, causing it to pivot and transfer the force to the second location of the facial interface.

In addition to the central arm, the linkage can include a second arm pivotably attached to a first end of the central arm, and a third arm pivotably attached to a second end of the central arm. The second arm and the third arm can be referred to as side arms or wings. The pivot point of the wings on the central arm can be longitudinally centered or can be offset on the wings. Each of the wings can be attached at their ends to the facial interface.

The wing ends can include a first connector and second connector attachable to the facial interface. For example, each end of the wing can include a ball that is received into a corresponding socket on the facial interface to form a ball joint. The ball joints can have about 30 degrees of motion. In some examples, the receiving socket on the facial interface is elongated to allow for translation of the ball connector within the elongated socket. Thus, the wings can be slidably attached to the facial interface. This can allow the facial interface to change its shape, resulting in a changing or a dynamic arc-length of the facial interface. In this manner, the linkage assembly evenly distributes a force applied to the facial interface.

In some examples, the range of motion of the linkage is limited by a motion-limiting component that restricts or limits a motion of the linkage. For example, the motion-limiting component can be a post or spring that extends from the frame. The linkage can contact the motion-limiting component as it rotates or pivots. In some examples, a spring can bias the linkage to a predetermined position.

In some examples, the facial interface includes one or more relief cutouts that enhance the ability of the facial interface to deform, stretch, or otherwise change its shape to conform to the user's face.

These and other embodiments are discussed below with reference to FIGS. 1-6. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1A illustrates a top view of a wearable electronic device or head-mountable device (HMD) 101 positioned on a user's head 102. The HMD 101 can include a display (also referred to as a display unit) 105 and a retention band 109. The display 105 can include any number of internal electronic components 107. The HMD 101 can include a frame 104 attached to the display 105. In some examples, the display 105 includes an opaque, translucent, transparent, or semi-transparent screen, including any number lenses, for presenting visual data. The frame 104 can at least partially border one or more edges of the display 105.

The HMD 101 can be worn on the user's head 102 such that the display 105 is positioned over the user's face and disposed over one or both of the user's eyes. The display 105 can be connected to the retention band 109 and/or the light seal 100. In some examples, the retention band 109 can be positioned against the side of a user's head 102 and in contact therewith. In some examples, the retention band 109 can be at least partially positioned above the user's ear or ears. In some examples, the retention band 109 can be positioned adjacent to the user's ear or ears. The retention band 109 can extend around the user's head 102. In this way, the display 105 and the retention band 109 can form a loop that can retain the wearable electronic device 101 on the user's head 102. It should be understood, however, that this configuration is just one example of how the components of a modular wearable electronic device 101 can be arranged, and that in some examples, a different number of connector straps and/or retention bands can be included. Although the particular component 101 can be referred to as an HMD, it should be understood that the terms wearable device, wearable electronic device, HMD, HMD device, and/or HMD system can be used to refer to any wearable device, including smart glasses.

In some examples, the frame 104 is attached to a facial interface 108. The facial interface can contact a user's head and/or face. In some examples, a light blocking component extends between the frame 104 and the facial interface 108. The light blocking component can cover or surround a perimeter of the frame 104 and/or the facial interface 108. The light blocking component can be a cloth, fabric, woven material, plastic, rubber, or any other suitable opaque or semi-opaque material. In some examples, the light blocking component is flexible, having the ability to repeatedly stretch, compress, and deform. The facial interface 108 in combination with the light blocking component is configured to block outside light and limits the peripheral view of the user.

In some examples, the frame 104 and the facial interface 108 is movably connected by movement mechanisms or linkages 106. As described in greater detail below, the linkages 106 can be used to distribute force throughout the facial interface and conform the facial interface to the user's head 102. In some example, the frame 104 is rigid and the facial interface 108 is deformable. Thus, using the linkages 106, the facial interface 108 can conform to the user's face in response to the user donning the HMD 101.

Any of the features, components, and/or parts, including the arrangements and configurations thereof shown in FIG. 1A can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1A.

Figure 1B:
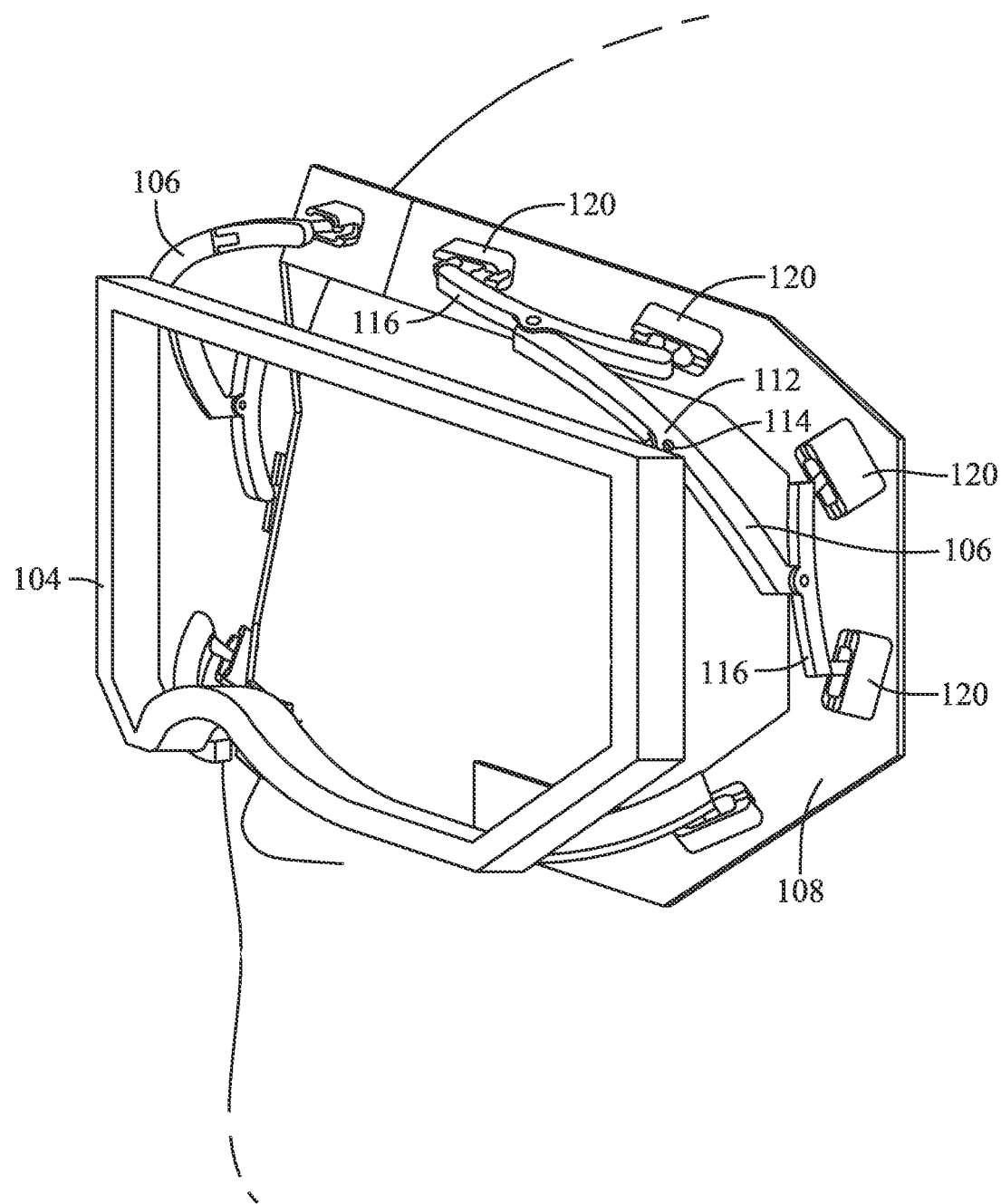
FIG. 1B shows a side perspective view of a frame and facial interface.
Figure 1C:
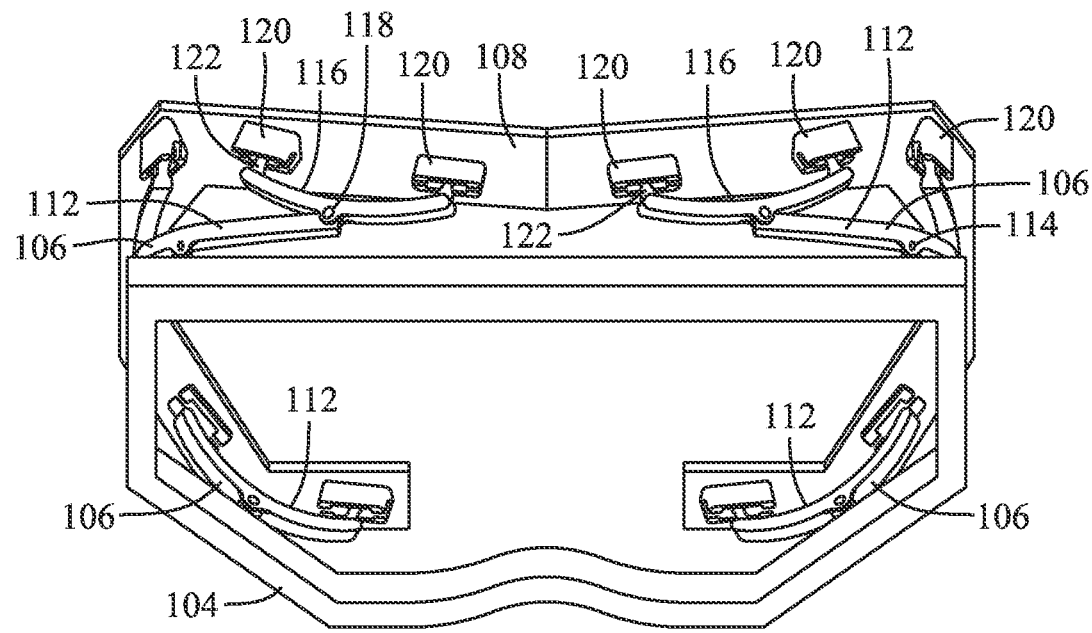
FIG. 1C shows a top perspective view of a frame and facial interface.

FIG. 1B shows a side perspective view of a frame 104 and a facial interface 108 for an HMD, such as HMD 101. FIG. 1C shows a top perspective view of the frame 104 and the facial interface 108. The frame 104 and the facial interface 108 can be substantially similar to, including some or all the features of, the frames and facial interfaces described herein.

The HMD can include various components forming a structure, webbing, cover, fabric, or frame of a head-mountable device disposed between the display 105 and the user skin. In particular implementations, a facial interface 108 forms a seal (e.g., a light seal, environment seal, dust seal, air seal, etc.) against the user's face. It will be appreciated that the term "seal" can include partial seals or inhibitors, in addition to complete seals (e.g., a partial light seal where some ambient light is blocked and a complete light seal where all ambient light is blocked when the head-mountable device is donned).

The frame 104 can attach or mount to a display unit, such as display 105, of a head-mountable device. The frame 104 can include a rigid material such that the frame resists changes to its shape. A first side or surface of the frame 104 can include attachment or engagement features to attach to the display unit of the HMD, while a second side, opposite the first side, can include attachment features to attach to the facial interface 108.

As used herein, the term "facial interface" refers to a portion of a head-mountable device that directly contacts a user's face. The facial interface 108 can also be referred to as a face track. The facial interface 108 can conform to (e.g., compress against and assume the shape of) regions of the user's face. In some examples, the facial interface 108 includes a pliant (or semi-pliant) material that spans the forehead, wraps partially around the eyes, contacts the zygoma and maxilla regions of the face.

Linkage(s) 106 can connect the frame 104 to the facial interface 108. As used herein, the terms "linkage", "linkage assembly", "connector", "arm", "joint", "movement mechanism", "bar", or "wing" refer to an attachment mechanism joining the frame 104 and the facial interface 108. In some examples, multiple linkages 106 allow the facial interface 108 to move (i.e., bend, flex, translate, rotate, etc.) relative to the frame 104. Accordingly, the linkage(s) 106 can movably constrain the display relative to the facial interface 108. In some examples, the linkage(s) 106 moveably constrain the facial interface 108 against a user's face (e.g., at a forehead location, a zygoma location, and/or a maxilla location). As used herein, the term "movably constrain" refers to a type of connection that allows for dynamic movement, yet retains control over a particular element's movement or position.

The linkage(s) 106 allow the facial interface 108 to conform freely to a wide range of facial topographies, sizes, and shapes, thereby allowing the facial interface 108 to pivot, bend, and flex. The linkage(s) 106 can evenly or unevenly distribute loads (e.g., forces exerted from different facial topographies or compression from the strap) evenly on a user's face. The linkage(s) 106 can include one or more joints (e.g., pivot joint, soft joint, flexure joint, spring joint, etc.) that allow (or actively provide) translation or rotation of the facial interface 108 relative to the display 105.

In some examples, the linkage 106 includes a primary or central bar 112 that is pivotably connected to the frame 104 at a pivot point 114. The pivot point 114 can include a pin, such as a metal or stainless steel pin, that connectably aligns an aperture in the frame 104 with an aperture in the central bar 112. In some examples, either end of the central bar 112 connects directly to the facial interface 108, for example, as shown by the lower central bars 112 near the cheeks in FIG. 1C. As shown, the pivot point 114 creates a hinge joint having a single degree of freedom. In other examples, the pivot point 114 can have additional degrees of freedom, such as by a ball and socket joint.

In some examples, the linkage 106 includes one or more secondary bars 116 that are pivotably attached to an end of the central bar 112 (e.g., the upper linkages 106 near the forehead region). The secondary bars 116 can be rotatably connected to the respective central bar 112 via pivot points 118 at either end of the central bar 112. As illustrated, the pivot points 118 can also be pinned joints or hinge joints having a single degree of freedom, though these locations can include joints having any number of degrees of freedom to facilitate motion.

In some examples, the central bars 112 and/or the secondary bars 116 can include connectors 122, such as balls, that engage with a corresponding receptacle 120 (e.g., socket) on the facial interface 108. As will be discussed in greater detail below, the connectors 122 can be locationally fixed to the facial interface, while in other examples, the connectors 122 can translate and/or rotate when secured to the receptacles 120.

As used herein, the term "forehead region" refers to an area of a human face between the eyes and the scalp of a human. Additionally, the term "maxilla region" refers to an area of a human face corresponding to the zygomatic bone structure of a human. Similarly, the term "maxilla region" refers to an area of a human face corresponding to the maxilla bone structure of a human. Further, the term "temple region" refers to an area of a human face between a respective eye and ear on a particular side of a face (e.g., between cheek bones and a forehead region).

Figure 1D:
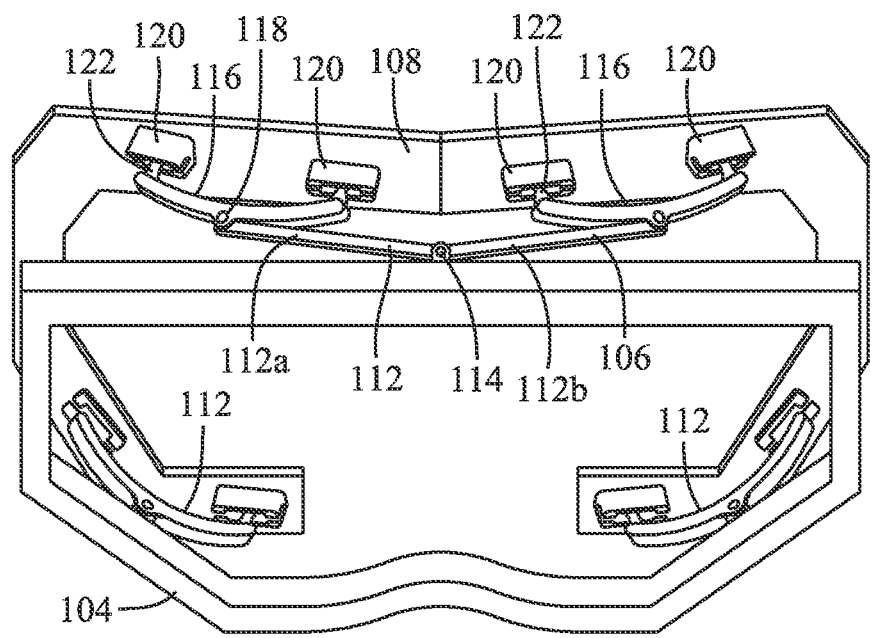
FIG. 1D shows a top perspective view of a frame and facial interface.

FIG. 1D shows a top perspective view the frame 104 and facial interface 108. It will be understood that the present disclosure is not limited in the number, placement, or configuration of the linkages 106. For example, FIG. 1C illustrates an example in which the linkage 106 is centrally positioned on the frame 104. Thus, as opposed two linkages 106 each positioned near the top corners of the frame 104 and facial interface 108, as shown in FIGS. 1B and 1C, a single linkage 106 can be centrally positioned at the forehead region of the light seal 100.

In some examples, the central bar 112 can include a left arm 112a and a right arm 112b. The left arm 112a and the right arm 112b can be a unitary component, with the movement of one directly impacting the movement of another. In some examples, the left arm 112a and the right arm 112b can move independent from one another.

It will be understood that only select components are shown and described in FIGS. 1A-1D for simplicity. The frame 104, facial interface 108, and linkages 106 are not limited to these components and can include additional components not shown or described herein.

Any of the features, components, and/or parts, including the arrangements and configurations thereof shown in FIGS. 1A-1D can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 1A-1D. Further, for simplicity, reference numbers ending in like or similar numbers, but with changes in the hundreds place may refer to the same or similar component from a different embodiment or figure. Further details regarding example linkages are provided below with reference to FIGS. 2A-3B FIG. 2A shows a linkage 206a. The linkage 206a can be substantially similar to, and can include some or all of the features of, the linkages described herein, such as linkages 106. The linkage 206a can be made from die cast magnesium, metal, carbon fiber, steel or any other material that provides a high strength to weight ratio. In some examples, the linkage 206a includes a flexible compliant material such as molded nylon.

The linkage 206a can include a primary or central bar 212 that attaches to a frame, such as frame 104, via a pivot point 214. The pivot point 214 can be an aperture integrally formed in the central bar 212 or can be a separate component that is fixed to the central bar 212. The central bar 212 can be substantially linear, having an elongated shape. The central bar 212 includes a first end 203 and a second end 205, opposite the first end 203. The longitudinal axis of the central bar 212 can extend between the first end 203 and the second end 205.

In some examples, each of the first end 203 and second end 205 includes side arms or support wings 216 pivotably attached via pivot points 218 to the first end 203 and second end 205, respectively. Each support wing 216 can include a first connection end 207 and a second connection end 209 having connectors 222. The connectors 222 can be balls, such as balls used in a ball joint connection. Other connector types, such as clips, pins, magnets, Velcro, etc., are also possible.

Thus, the central bar 212 can pivot or rotate about pivot point 214 and the support arms 216 can pivot or rotate about the pivot points 218. Because of this, forces that are applied to one or more of the connectors 222 can be at least partially transferred through the linkage 206a. For example, a downward (as oriented in FIG. 2A) force applied to a connector 222 can cause the support wing 216 and/or central bar 212 to pivot, which in turn can cause the facial interface to better conform the a user's face. Further, the linkage 206a can evenly distribute forces applied to the facial interface and/or display frame.

In some examples, the central bar 212 and/or the support wings 216 can be substantially linear, other shapes are also possible. For example, FIG. 2B illustrates a linkage 206b wherein the central bar 212 and support wings 216 can be curved. In some examples, the central bar 212 and/or wings 216 can be rigid. In some examples, the central bar 212 and/or wings 216 can be compliant and can flex or deform in response to a force applied to a connector 222 and/or to the pivot point 214. In some examples, the linkages 206a and 206 be can be whipple or whiffle tree mechanisms.

Any of the pivot points (e.g., 214, 218) can be centered on their respective bars 212, 216 (i.e., centered on a length or longitudinal axis of the bar). Centered pivot points can equally distribute forces through the linkage 206. In some examples, the pivot points can be off center or offset to one side or the other of the bar, creating an asymmetric lever. Offsetting the pivot points can be used to tune force distribution through the linkage. An offset pivot point can increase or decrease forces in desired areas). For example, using an offset pivot point, a large force can create a small movement in one region leading to a large movement small force in another region.

In some examples, the pivot point can be adjusted or changed. For example, the pivot point can shifted or translated according to the needs or preferences of the user. The pivot point of one or more of the linkage bars can be manually or automatically adjusted.

Figure 2A:
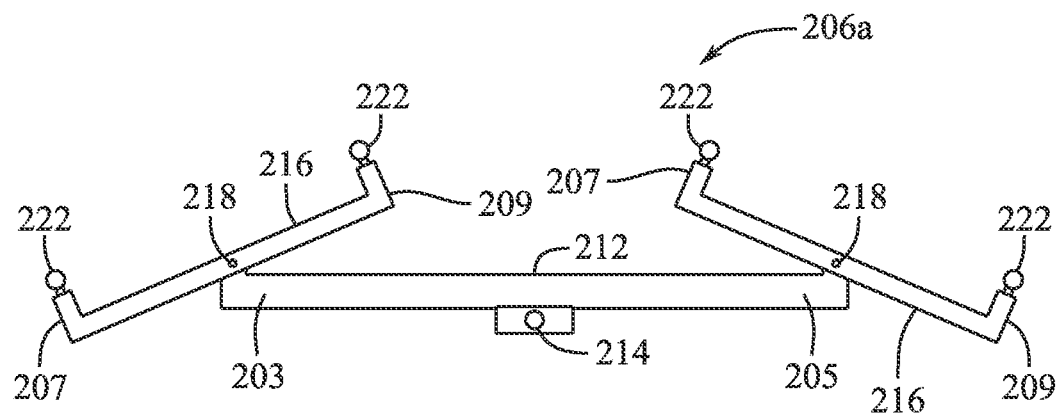
FIG. 2A shows a linkage assembly.
Figure 2B:
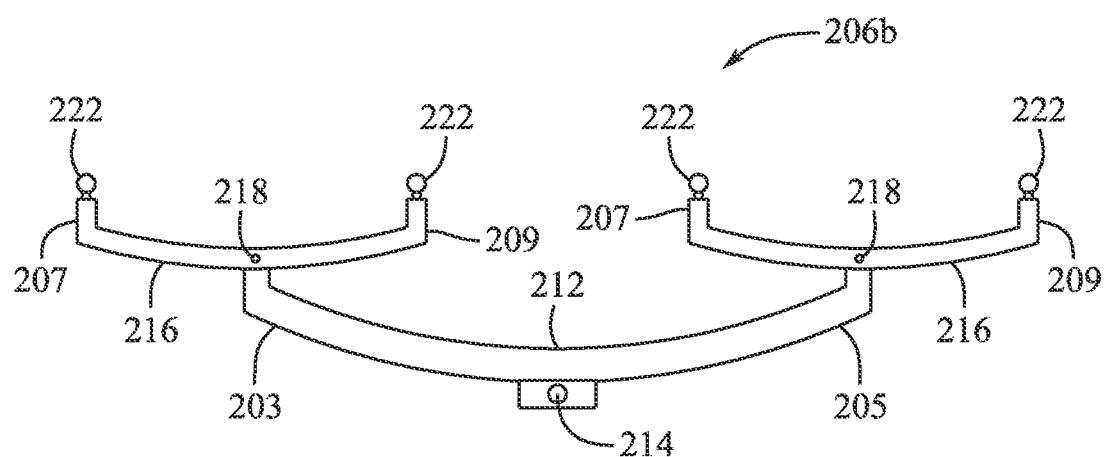
FIG. 2B shows a linkage assembly.

Any of the features, components, and/or parts, including the arrangements and configurations thereof shown in FIGS. 2A and 2B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 2A and 2B. Further, for simplicity, reference numbers ending in like or similar numbers, but with changes in the hundreds place may refer to the same or similar component from a different embodiment or figure.

Figure 3A:
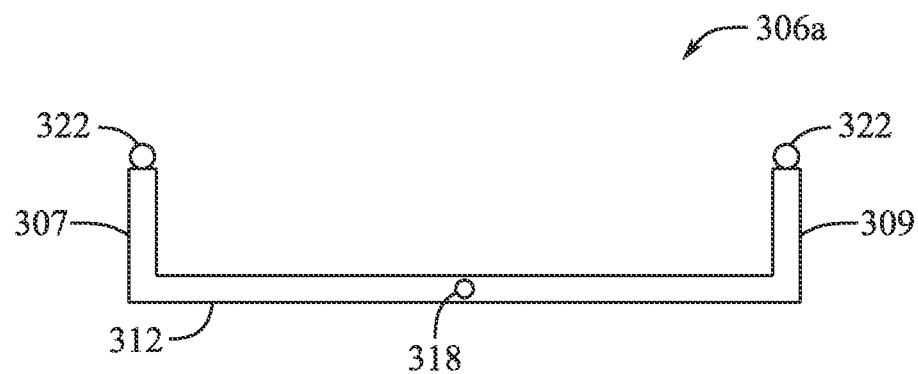
FIG. 3A shows a linkage assembly.

FIG. 3A shows a linkage 306a. The linkage 306a can be substantially similar to, and can include some or all of the features of, the linkages described herein, such as linkages 106, 206a, and 206b. The linkage 306a can include a primary or central bar 312 that attaches to a frame, such as frame 104, via a pivot point 318. The pivot point 318 can be an aperture integrally formed in the central bar 312 or can be a separate component that is fixed to the central bar 312. The central bar 312 can be substantially linear. The central bar 312 can include a first end 307 and a second end 309, opposite the first end 307. In some examples, each of the first end 307 and second end 309 includes connectors 322. The connectors 322 can be balls, such as balls used in a ball joint connection. Other connector types, such as clips, pins, magnets, etc., are also possible. Unlike the linkages 206a and 206b, the linkage 306a does not include additional support wings. Thus, the linkage 306a directly connects to both the frame and the facial interface.

The central bar 313 can pivot or rotate about pivot point 318. For example, forces that are applied to one side of the linkage 306a can be distributed through the linkage 306a. For example, using the orientation of FIG. 3A, a downward force applied to the first end 307 can cause the central bar 312 to rotate counter-clockwise, thereby raising upward the second end 309. Thus, the linkage 306a can cause the facial interface to better conform a user's face. Further, the linkage 306a can evenly distribute forces applied to the facial interface and/or display frame.

Figure 3B:
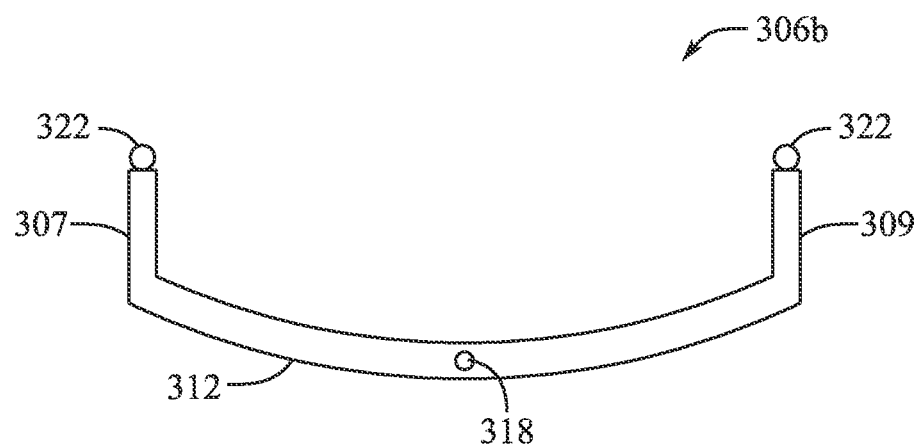
FIG. 3B shows a linkage assembly.

In some examples, the central bar 312 can be substantially linear, however, other shapes are also possible. For example, FIG. 3B illustrates a linkage 306b wherein the central bar 312 can be curved. In some examples, the central bar 312 can be rigid. In some examples, the central bar 312 can be compliant and can flex or deform in response to a force applied to a connector 322 and/or to the pivot point 314.

Any of the features, components, and/or parts, including the arrangements and configurations thereof shown in FIGS. 3A and 3B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 3A and 3B. Further, for simplicity, reference numbers ending in like or similar numbers, but with changes in the hundreds place may refer to the same or similar component from a different embodiment or figure.

Figure 4A:
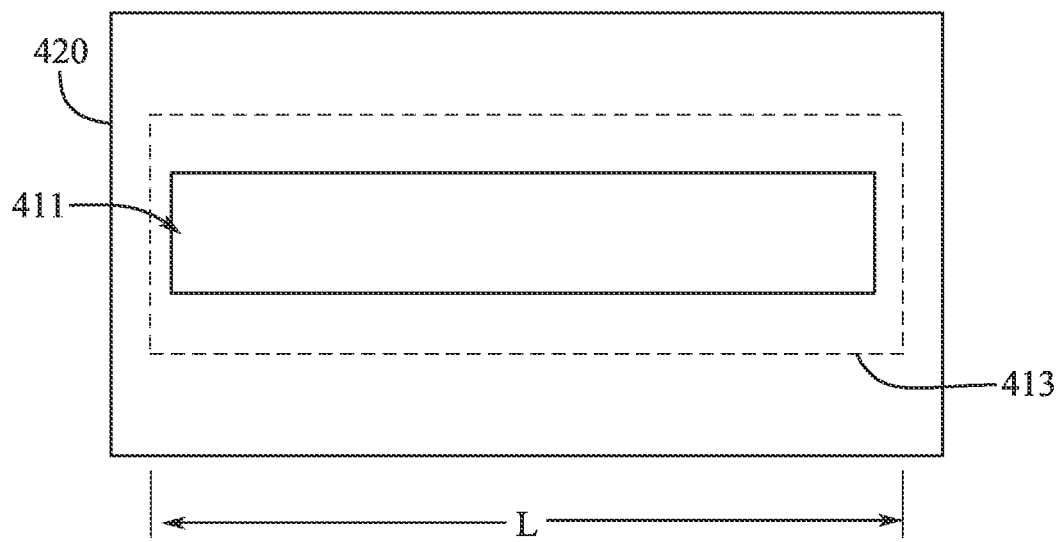
FIG. 4A shows a receiving socket.

FIG. 4A shows a socket 420. The socket 420 can be a receptacle, recess, groove, hole, slit, or any other suitable attachment feature that is positioned on the facial interface and which connects to the linkages (e.g., via connectors 222). The socket 420 can be integrally formed in the facial interface or the socket 420 can be a separate component that is secured to the facial interface at a predetermined location. The socket 420 can be made from the same or different material as the facial interface.

In some examples, the socket 420 includes an opening 411. The size of the opening 411 can be smaller than an internal volume 413. In some examples, the opening 411 is elongated to allow the linkage to translate along the length L of the internal volume 413. It will be understood that as the linkage translates along the length L, the arc length of the facial interface can change. The shape or arc length of the facial interface can be dynamic (i.e., non-constant).

Figure 4B:
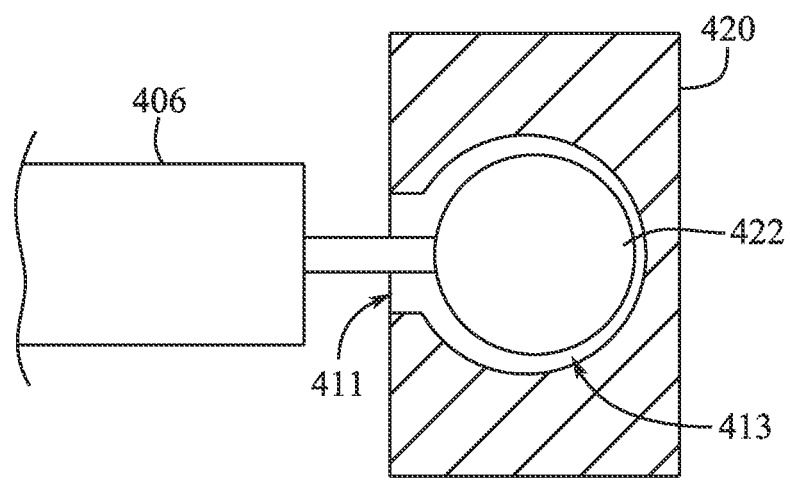
FIG. 4B shows a ball joint assembly.

FIG. 4B shows a side view of linkage 406 with a connector 422 positioned within the internal volume 413 of the socket 420, forming a type of ball joint. In some examples, the diameter of the ball connector 422 is smaller than the internal volume 413, but larger than the opening 411. This allows the ball connector 422 to move freely along a length L of the socket 420, while preventing the ball connector 422 from slipping out of the internal volume 413.

Figure 4C:
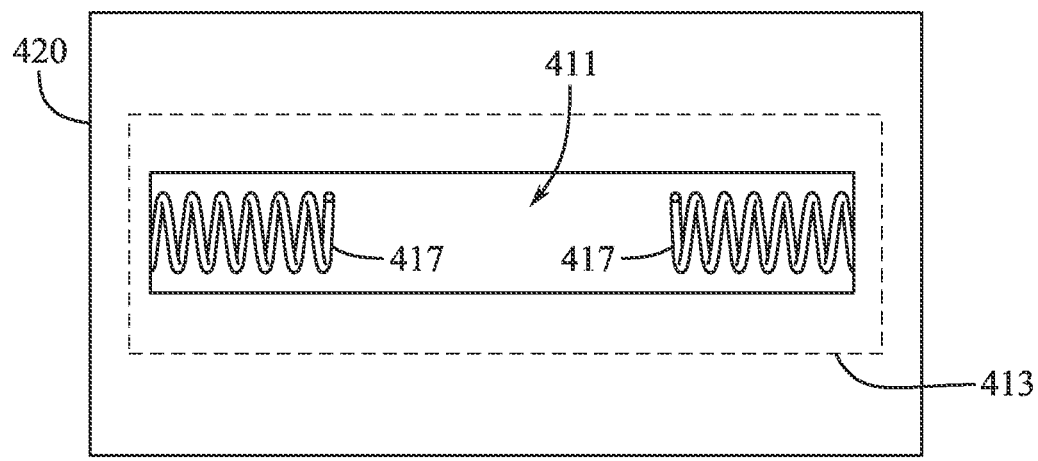
FIG. 4C shows a receiving socket.

FIG. 4C shows an example embodiment in which the socket 420 includes one or more biasing elements, such as springs 417 that bias the linkage into a predetermined position. For example, the socket 420 can include two springs 417 extending from opposing sides of the internal volume 413. Thus, when the linkage connector translates horizontally, the connector compresses a spring 417 to bias the connector back toward its original rest state. It will be understood that other biasing elements, such as magnets or pneumatics can be used.

Figure 4D:
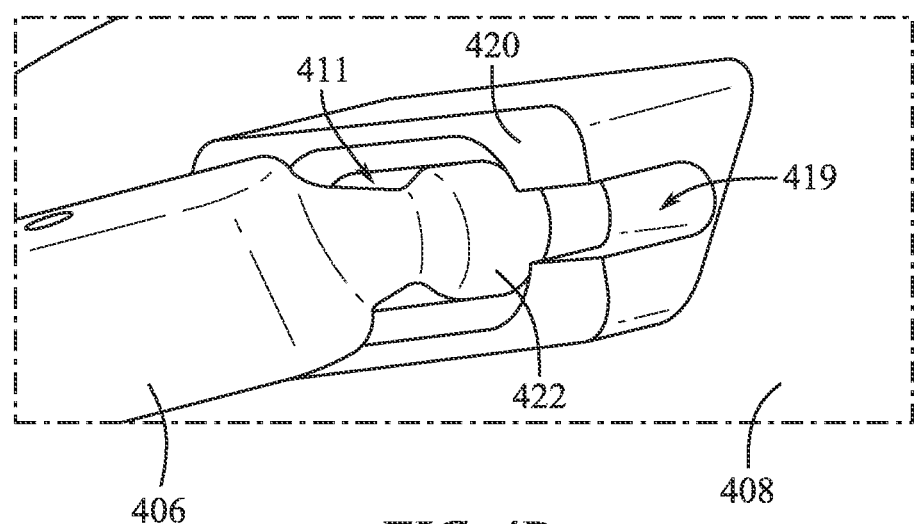
FIG. 4D shows a ball joint assembly.

FIG. 4D shows a perspective view of a linkage 406 with a connector 422 inserted through the opening 411 of the socket 420. In some examples, the diameter of the ball connector 422 is larger than the opening 411. In some examples, the socket 420 includes flexure reliefs 419 that allow the socket to deform in response to sufficient force. For example, if the ball 422 was not yet connected to the socket 420, the ball 422 could be inserted into the socket 420 by pressing the ball against the opening 411 with sufficient force to deform the socket 420 and thereby temporarily increase the size of the opening 411. Likewise, to remove the ball 422, one need only pull the linkage and facial interface 408 in opposite directions with sufficient force to cause the socket to flex enough for the ball 422 to pass through the opening 411. In some examples, the ball 422 can have a range of motion of approximately 30 degrees in the socket 420.

Any of the features, components, and/or parts, including the arrangements and configurations thereof shown in FIGS. 4A-4D can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 4A-4D. Further, for simplicity, reference numbers ending in like or similar numbers, but with changes in the hundreds place may refer to the same or similar component from a different embodiment or figure.

Figure 5A:
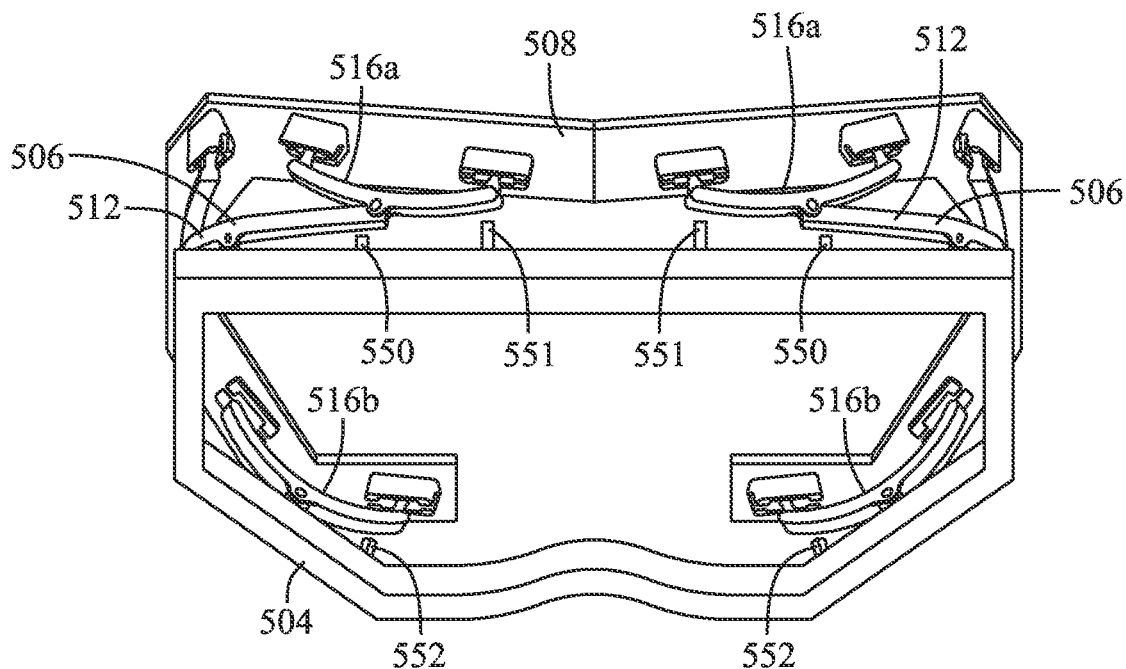
FIG. 5A shows a top perspective view of a frame and facial interface including posts.

FIG. 5A shows a top perspective view of a frame 504 connected to a facial interface 508 with linkages 506. The frame 504, facial interface 508, and linkage 506 can be substantially similar to, and can include some or all of the features of, the frame, facial interfaces, and linkages described herein. In some circumstances, it may be desirable to not allow the linkages 506 to have a full range of motion. For example, allowing the linkages to freely pivot may cause undesired contact between the linkages 506 and the frame 504. Thus, it may be desirable to constrain, limit or restrict the movement of the linkages 506.

In some examples, frame 504 includes components to limit movement of the linkages 506. In some examples, the frame 504 can include posts 550, 551, 552 that extend from the frame 504 toward the linkages 506. The posts 550, 551, 552 can be positioned to contact a portion of the linkage 506 and prevent further motion beyond the post. For example, the central arms 512 of the upper linkages 506 can have their movement restricted by posts 550. Similarly, the wings 516a can come into contact with posts 551, and the arms 516b can contact posts 552. In some examples, the posts 550, 551, 552 can act as a fulcrum or new pivot point about which an arm of the linkage can rotate.

The posts 550, 551, 552 can be integrally formed or molded from the frame 504. In some examples, the posts 550, 551, 552 can be separate components that are attached to the frame 504. The posts 550, 551, 552 can be rigid, semi-rigid, or elastic.

Figure 5B:
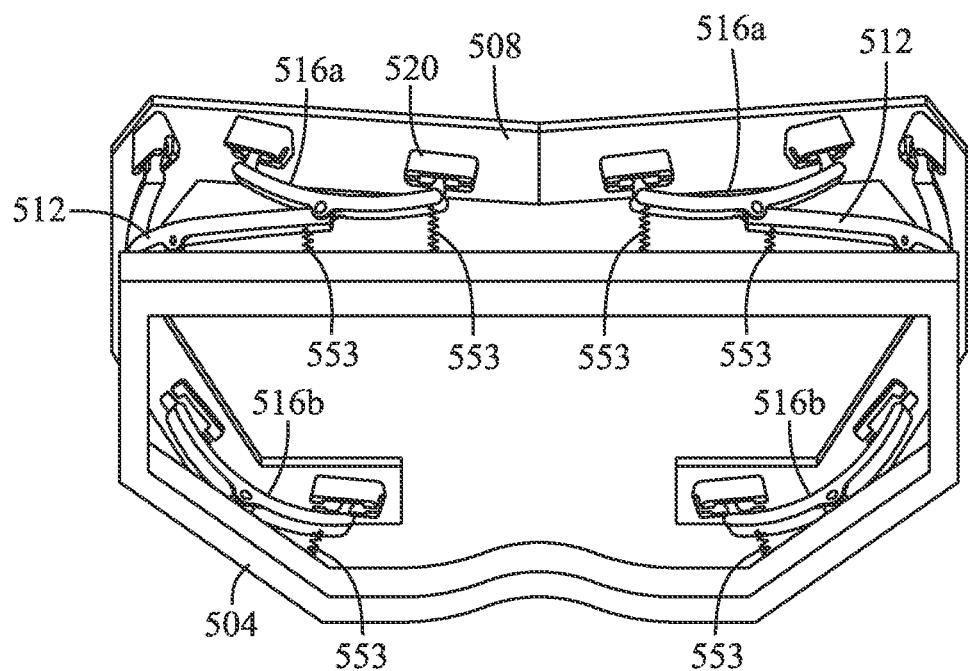
FIG. 5B shows a top perspective view of a frame and facial interface including springs.

FIG. 5B shows an example embodiment in which the motion-limiting components are springs 553. The springs 553 can be attached at a first end to the frame 504 and positioned such that rotation of the linkages 506 compresses corresponding springs 533. The compressed springs 553 resist further movement in the direction of compression and bias the linkage 506 to return to its original state. In some examples, a second end of the springs 553 is attached to corresponding linkage points. Thus, the springs 553 can be pulled or stretched by rotation of the linkages 506 and can provide a biasing force for the linkage to return to an original position.

In some examples, the motion-limiting components can be built into the linkages themselves. For example, the pivot points can include limiters to prevent over extension or over rotation of the linkages. In some examples, the linkages include integral springs to limit movement of the linkages. For example, the pivot points can include internal torsion springs.

Any of the features, components, and/or parts, including the arrangements and configurations thereof shown in FIGS. 5A and 5B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 5A and 5B. Further, for simplicity, reference numbers ending in like or similar numbers, but with changes in the hundreds place may refer to the same or similar component from a different embodiment or figure.

Figure 6:
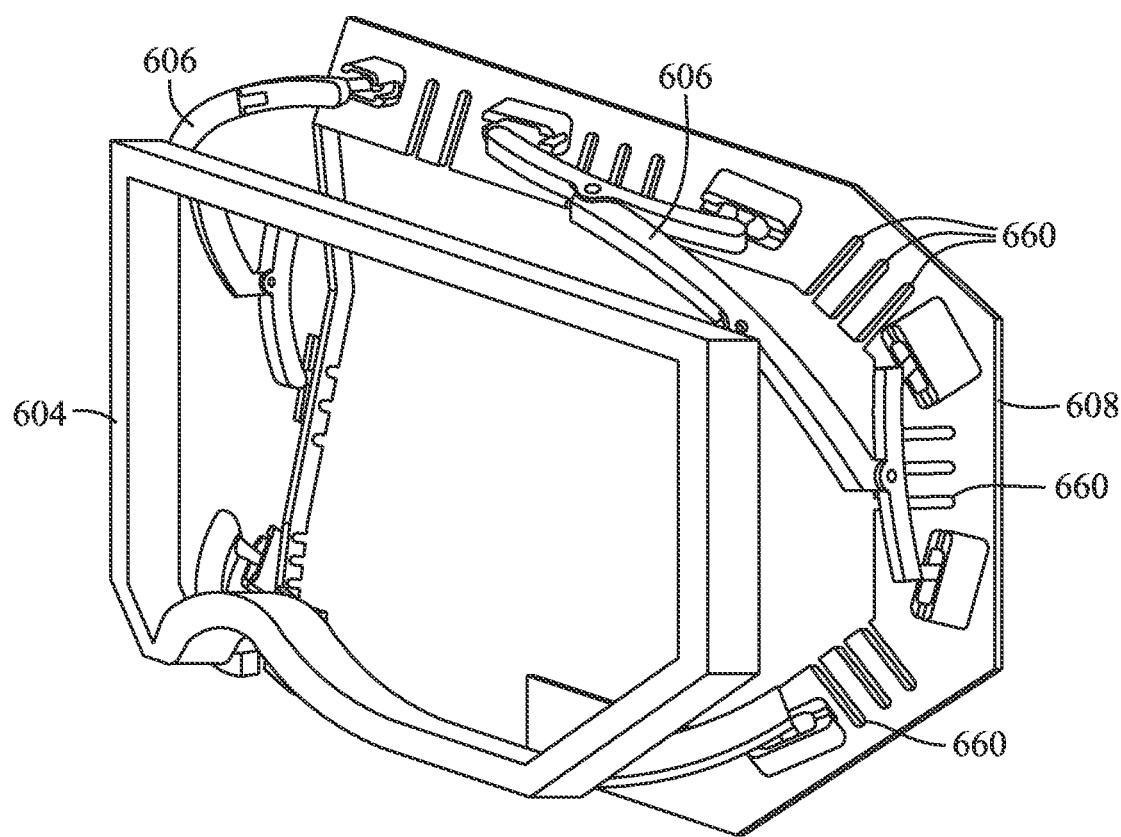
FIG. 6 shows a side perspective view of a frame and facial interface including relief cutouts.

FIG. 6 shows a side perspective view of a frame 604, linkages 606, and facial interface 608. The frame 604, linkages 606, and facial interface 608 can be substantially similar to, and can include some or all of the features of, the frames, linkages, and facial interfaces described herein. In some examples, the facial interface 608 includes relief cutouts 660. As used herein, the term "relief cutout(s)" refers to thru-holes, dimples, slits, slots, core-outs, recesses, etc. The relief cutouts 660 can be holes, slits, grooves, recesses, or other absences in the facial interface 608 that allow for reliefs in the material and for changes to the arc length of the facial interface. In some examples, the reliefs are changes in material rather than absences in the material. The change in material can include changes in the thickness or dimensions of the material or changing the material to a different material.

In addition to better allowing flexure and conformation of the facial interface 608, the relief cutouts provide weight advantages while maintaining the structural integrity and shape (e.g., deflection integrity, stress integrity, etc.) of the facial interface 608.

Here, the relief cutouts 660 include thru-holes in the facial interface 608. The thru-holes can be sized and shaped in a variety of ways and can be tuned to fit a devices needs or the user's preferences. In some examples, the thru-holes are rectangular, square, triangular, circular, etc. In other examples, the thru-holes are lozenge-shaped (e.g., cylindrical, pill-shaped) thru-holes. The relief cutouts 660 also include a spacing that can be optimized or tuned (as may be desired). Indeed, the relief cutouts 660 can be spaced apart to satisfy a threshold force or stress/strain profile of the facial interface 608. The relief cutouts 660 can be spaced apart to provide a particular amount of flexibility or rigidity. In some examples, the relief cutouts 660 are omitted from certain areas (e.g., at connector support areas corresponding to the linkage connectors). Thus, some connector support areas are devoid of the relief cutouts 660.

Any of the features, components, and/or parts, including the arrangements and configurations thereof shown in FIG. 6 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 6. Further, for simplicity, reference numbers ending in like or similar numbers, but with changes in the hundreds place may refer to the same or similar component from a different embodiment or figure.

To the extent the present exemplary systems and methods use personally identifiable information to improve the system or the user experience, such use of personally identifiable information should conform to privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description used specific, exemplary, nomenclature to provide a thorough understanding of the described embodiments. The specific details are not required in order to practice the described examples. Rather, the foregoing descriptions of the specific embodiments and examples described herein are presented for purposes of illustration and description only. They are not intended to be exhaustive or to limit the embodiments to the precise forms disclosed. Many modifications and variations are possible in view of the above teachings.

What is claimed is:

1. A wearable device comprising:
  a display;
  a frame at least partially housing to the display;
  a facial interface to span along a forehead region, an eye region, and a cheek region, the facial interface movably attached to the frame; and
  a linkage assembly movably connecting the facial interface to the frame, the linkage assembly comprising:
    a first arm pivotably attached to the frame, the first arm comprising a first end and a second end;
    a second arm pivotably attached to the first end and attached to the facial interface; and
    a third arm pivotably attached to the second end and attached to the facial interface.

2. The wearable device of claim 1, wherein:
  the wearable device is a head-mountable device;
  each of the second arm and the third arm comprises a first connector and a second connector attachable to the facial interface; and the linkage assembly evenly distributes a force applied to the facial interface.

3. The wearable device of claim 1, wherein the second arm and the third arm are slidably attached to the facial interface.

4. The wearable device of claim 1, further comprising a ball joint connecting the facial interface and the linkage assembly.

5. The wearable device of claim 4, wherein the ball joint has about 30 degrees of motion.

6. The wearable device of claim 1, wherein the facial interface comprises an elongated socket.

7. The wearable device of claim 1, wherein:
the second arm is pivotably attached to the facial interface at a first location and at a second location; and
the third arm is pivotably attached to the facial interface at a third location and at a fourth location.

8. The wearable device of claim 1, wherein the facial interface comprises a dynamic arc-length.

9. A head-mountable device comprising:
a display unit;
a facial interface conformable to at least a forehead region and a zygoma region; and
a movement mechanism connecting the facial interface to the display unit, the movement mechanism comprising:
a pivot rotatably attached to the display unit;
a first end moveably attached at a first location of the facial interface; and
a second end moveably attached at a second location of the facial interface.

10. The head-mountable device of claim 9, wherein the second location moves in response to a force being applied at the first location.

11. The head-mountable device of claim 9, wherein the movement mechanism comprises:
a central arm including the pivot;
a first side arm pivotably connected to a first portion of the central arm on a first side of the pivot; and
a second side arm pivotably connected to a second portion of the central arm on a second side of the pivot.

12. The head-mountable device of claim 9, wherein the facial interface contacts a maxilla region of a user during use.

13. The head-mountable device of claim 9, wherein the movement mechanism distributes forces evenly through the movement mechanism.

14. The head-mountable device of claim 9, further comprising a post disposed on the head-mountable device to restrict a motion of the movement mechanism.

15. The head-mountable device of claim 9, further comprising a spring connecting the movement mechanism to the display unit.

16. The head-mountable device of claim 9, wherein the facial interface comprises a relief cutout.

17. A facial interface for a head-mountable device, comprising:
a frame;
a conformable member that, when donned, assumes a shape of a facial region; and
a linkage connecting the frame and the conformable member, the linkage attached to the frame at a hinge joint, and attached to the conformable member at a pivot point.

18. The facial interface of claim 17, wherein the linkage deforms the conformable member at a first location in response to the conformable member being deformed at a second location.

19. The facial interface of claim 17, wherein the hinge joint is centered along a longitudinal axis of the linkage.

20. The facial interface of claim 17, wherein the pivot point is adjustable.

21. The facial interface of claim 17, wherein the frame is rigid and the conformable member is deformable.

* * * * *